US009713938B2

(12) United States Patent
Baker

(10) Patent No.: US 9,713,938 B2

(45) Date of Patent: Jul. 25, 2017

(54) ARTWORK SURFACE AND METHOD OF USE

(71) Applicant: Mary A Baker, Alexandria, VA (US)

(72) Inventor: Mary A Baker, Alexandria, VA (US)

(*) Notice: Subject to any disclaimer, the term of this patent is extended or adjusted under 35 U.S.C. 154(b) by 199 days.

(21) Appl. No.: 14/050,581

(22) Filed: Oct. 10, 2013

(65) Prior Publication Data

US 2014/0106114 A1 Apr. 17, 2014

Related U.S. Application Data

(60) Provisional application No. 61/713,486, filed on Oct. 13, 2012.

(51) Int. Cl.
*G09B 11/00* (2006.01)
*B44D 2/00* (2006.01)

(52) U.S. Cl.
CPC ......... *B44D 2/00* (2013.01); *Y10T 428/24149* (2015.01); *Y10T 428/24694* (2015.01); *Y10T 428/24802* (2015.01)

(58) Field of Classification Search
USPC .. 434/81, 82, 84, 96, 97, 98, 408, 413, 414, 434/428; 428/116, 158, 191
See application file for complete search history.

(56) References Cited

U.S. PATENT DOCUMENTS 4,045,897 A * 9/1977 Gates .............................. 40/620
4,064,301 A * 12/1977 Howard .................. A01G 5/04 156/257
4,065,596 A * 12/1977 Groody ......................... 428/215
4,135,020 A 1/1979 Maxwell
4,207,366 A 6/1980 Tyler
4,771,079 A 9/1988 Melber
4,854,970 A 8/1989 Wiech, Jr.
4,885,193 A 12/1989 Head
5,360,664 A * 11/1994 Hamm ............................ 442/38
5,418,024 A 5/1995 Inashvili
5,681,639 A * 10/1997 Minagawa .............. E04B 1/762 428/143
5,775,919 A * 7/1998 Gardner ........................ 434/408
6,432,520 B2 * 8/2002 Pynenburg ...................... 40/600
6,569,277 B1 5/2003 Gibbs
6,783,587 B2 * 8/2004 Sethuraman .......... C04B 28/147 106/674
6,863,972 B2 3/2005 Burger et al.
6,889,458 B2 * 5/2005 Copley ........................... 40/711
6,951,068 B1 10/2005 Weatherill
(Continued)

OTHER PUBLICATIONS

"Foam Board" (available at www.exantia.co.uk), Dec. 24, 2010 [retrieved online Sep. 1, 2015].*

*Primary Examiner* — Kurt Fernstrom
(74) *Attorney, Agent, or Firm* — Audrey Pham Wade; Wade IP Law LLC

(57) ABSTRACT

The present invention relates, in general, to a novel artwork surface and, in particular, to an ultra lightweight dispersed solid artwork surface and methods of creating artwork structures. Techniques are described herein that are capable of creating an innovative artwork structure. For example, a method of preparing a dispersed solid artwork surface, applying said medium to said dispersed solid artwork surface, finishing said dispersed artwork surface to create an artwork structure, and displaying said artwork structure.

20 Claims, 5 Drawing Sheets

(56) References Cited

U.S. PATENT DOCUMENTS

| | | | | | |
|---|---|---|---|---|---|
| 7,472,450 | B2 | 1/2009 | Silva | | |
| 7,892,637 | B2 | 2/2011 | Allen et al. | | |
| 8,157,872 | B2 | 4/2012 | Becvar et al. | | |
| 8,291,628 | B2 | 10/2012 | Acworth | | |
| RE44,673 | E * | 12/2013 | Albenda | .......................... | 40/610 |
| 8,921,473 | B1 * | 12/2014 | Hyman | .......................... | 524/445 |
| 2007/0215564 | A1 * | 9/2007 | Westendorf et al. | ........ | 211/13.1 |
| 2009/0013332 | A1 * | 1/2009 | Ross et al. | .................... | 719/315 |
| 2009/0259567 | A1 * | 10/2009 | Watts | .............................. | 705/27 |
| 2010/0229442 | A1 * | 9/2010 | Snow et al. | .................... | 40/761 |
| 2014/0272919 | A1 * | 9/2014 | Schulman | ..................... | 434/428 |
| 2014/0326420 | A1 * | 11/2014 | Kaishian et al. | ............. | 160/381 |

* cited by examiner

ARTWORK SURFACE AND METHOD OF USE

RELATED APPLICATIONS

The present application claims the benefit of priority under 35 USC 119(e) Provisional Pat. Appl. No. 61/713,486 filed on 13 Oct. 2012, said patent documents being incorporated herein in entirety for all purposes by reference.

BACKGROUND

Art is characterized in terms of aesthetics, mimesis, expression, communication of emotion, creativity, interpretation or other values related to creation through imaginative or technical skill. Visual art relates to creation of images or objects in the fields including drawing, painting, sculpture, printmaking, photography, architecture, carpentry, digital graphics, visual designs, electronic and other media as a mean to communicate about the self as expression, or the world as a narrative, imagination, prediction, or teaching. A typical visual artwork is conventionally created utilizing an artistic solid surface such as a canvas, card stock, metal, paper, wood, plaster, clay or the like. The surface that is used often influence the art form (i.e., the specific shape or quality an artistic expression takes) and is subjected to constraints and limitations. For example, a sculpture must exist in space in three dimensions and is constraint by gravity. In another example, a painting is influenced by the canvas texture, color and brush texture.

Using a traditional solid surface for artistic expression posses many inherent limitations, including laborious preparations, high cost, and substantial weight of the solid artwork surface which may lead to difficulties in handling, displaying, moving the artwork. For example, an typical artwork painted on canvas is subsequently supported by a mat, mat board, liners, heavy wood or metal frame, and other finishing options such as easel backs, canvas clips, and framing hardware including canvas stretcher bars, etc. and oftentimes provided with glass or plexi-glass cover. To provide another example, an average person moves approximately twelve times in his/her lifetime, with most of the mobility occurred in the first one-third of a person's lifespan. For such highly mobile people, it is not desirable to own pieces of artwork due to difficulties in moving cumbersome luxury items.

The instant invention resulted from a need to provide an artwork surface that is extremely lightweight for ease of handling, displaying and moving the artwork structure, which is especially useful for people who frequently change residences. The instant invention disclosed and claimed herein provides distinct and useful advantages not previously known in the prior art. More specifically, the instant invention has many distinct advantages including, but not limited to, reduced preparation time and cost, reduced material cost, ultra lightweight, and ease of handling, display, moving or storing the artwork. Consequently, the novel artwork surface provides a new art form for creative expressive communication not previously encountered in the visual art field.

SUMMARY

Various approaches are described herein for, among other things, a novel artwork structure and a method for creating an said artwork structure, wherein preparing a dispersed solid artwork surface (DSAS) optionally to enhance acceptance of a medium, applying said medium to said dispersed solid artwork surface, superimposing an element optionally to said medium to said dispersed solid artwork surface, finishing said dispersed artwork surface to create an artwork structure, and displaying said artwork structure.

A method is described wherein said DSAS is an ultra lightweight (ULW) surface selected from the group consisting of a rigid lightweight closed-cell foam (RCL), a closed-cell extruded polystyrene foam, an expanded polystyrene foam, a polyurethane foam, a polystyrene, a polystyrene closed-cell foam (PCCF), a cork, a compact multiply paperboard, a high-impact polystyrene, a fused cell expanded polystyrene foam, an atactic polystyrene, a syndiotactic polystyrene, a honeycomb structural material, a lightweight fiber, a post-consumer content material; said medium is one or a combination of media selected from the group consisting of an acrylic, metallic, pastel, watercolor, ink, hot wax, fresco, gesso, glaze, gouache, enamel, spray, tempera, latex, magna, oil, water miscible oil, blacklight, primer, stencil, encaustic, chalk, charcoal, conte stick, sumi-e, vinyl, vitreous enamel, crayon, graphite, marker, pencil; said element is an ultra lightweight surface selected from the group consisting of a closed-cell foam, a rigid closed-cell lightweight foam (RCL), an open cell-foam, a closed-cell extruded polystyrene foam, an expanded polystyrene foam, a polyurethane foam, a polystyrene, a polystyrene closed-cell foam, honeycomb foam and a cork; said element is a decorative or a combination of decorative elements selected from the group consisting of jewels, ribbons, embellishments, glitter, paper, fabric, metal, wood, glass, functional construct, shelves, digital construct, photos, videos, photos of masterpieces, a closed-cell foam, a rigid lightweight closed-cell foam (RCL), an open cell-foam, a closed-cell extruded polystyrene foam, an expanded polystyrene foam, a polyurethane foam, a polystyrene, a polystyrene closed-cell foam, a cork, a compact multiply paperboard, honeycomb structural material, cork, lightweight fibers, and post-consumer content material.

A method is described wherein said dispersed artwork surface comprises a plurality of dispersed artwork surfaces joinable and articulatable and wherein said dispersed solid artwork surface (DSAS) comprises a plurality of DSAS joining for an articulated contiguous artwork structure composition by adhering superimposed said element in opposing relationship over a first and second DSAS providing a gap between said first and second DSAS allowing for the provision of articulatable artwork structure providing one or more perspective(s) selected from the following: continuation, varied or oppositional, multi-dimensional perspective.

A method is described wherein comprising a plurality of DSAS joining for an articulated contiguous artwork structure composition by adhering superimposed said element in opposing relationship over a first and second DSAS to form an articulative joint providing a gap between said first and second DSAS allowing for the provision of articulatable artwork structure providing one or more perspective(s) such as a continuation, varied, oppositional, and/or multi-dimensional perspective, reinforcing said articulative joint with a polymer laminate, utilizing said articulatable artwork structure as an interior or architectural structure, and displaying said articulatable artworks structure as a functional and aesthetic structure.

An artwork structure is described that includes a dispersed solid artwork surface (DSAS), an element, and a medium; wherein said DSAS is an ultra lightweight (ULW) surface selected from the group consisting of a rigid lightweight closed-cell foam (RCL), a closed-cell extruded polystyrene foam, an expanded polystyrene foam, a polyurethane foam, a polystyrene, a polystyrene closed-cell foam, a cork, a compact multiply paperboard, a high-impact polystyrene, a fused cell expanded polystyrene foam, an atactic polystyrene, and a syndiotactic polystyrene, honeycomb structural material, cork, lightweight fibers, post-consumer content material; wherein said medium is one selected from the group consisting of an acrylic, metallic, pastel, watercolor, ink, hot wax, fresco, gesso, glaze, gouache, enamel, spray, tempera, latex, magna, oil, water miscible oil, blacklight, primer, stencil, encaustic, chalk, charcoal, conte stick, sumi-e, vinyl, vitreous enamel, crayon, graphite, marker, pencil; said element is a decorative or a combination of decorative elements selected from the group consisting of jewels, ribbons, embellishments, glitter, paper, fabric, metal, wood, glass, functional construct, shelves, digital construct, photos, videos, photos of masterpieces, a closed-cell foam, a rigid lightweight closed-cell foam (RCL), an open cell-foam, a closed-cell extruded polystyrene foam, an expanded polystyrene foam, a polyurethane foam, a polystyrene, a polystyrene closed-cell foam, a cork, a compact multiply paperboard, honeycomb structural material, cork, lightweight fibers, and post-consumer content material.

The artwork structure is described wherein said dispersed artwork surface comprises a plurality of DSAS joinable and articulatable by adhering superimposed said element in opposing relationship over a first and second DSAS to form an articulative joint providing a gap between said first and second DSAS allowing for the provision of articulatable artwork structure providing one or more perspective(s) such as a continuation, varied, oppositional, or multi-dimensional perspective, reinforcing said articulative joint with a polymer laminate, utilizing said articulatable artwork structure as an interior or architectural structure, and displaying said articulatable artworks structure as a functional and aesthetic structure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

DETAILED DESCRIPTION

I. Introduction

Figure 1:
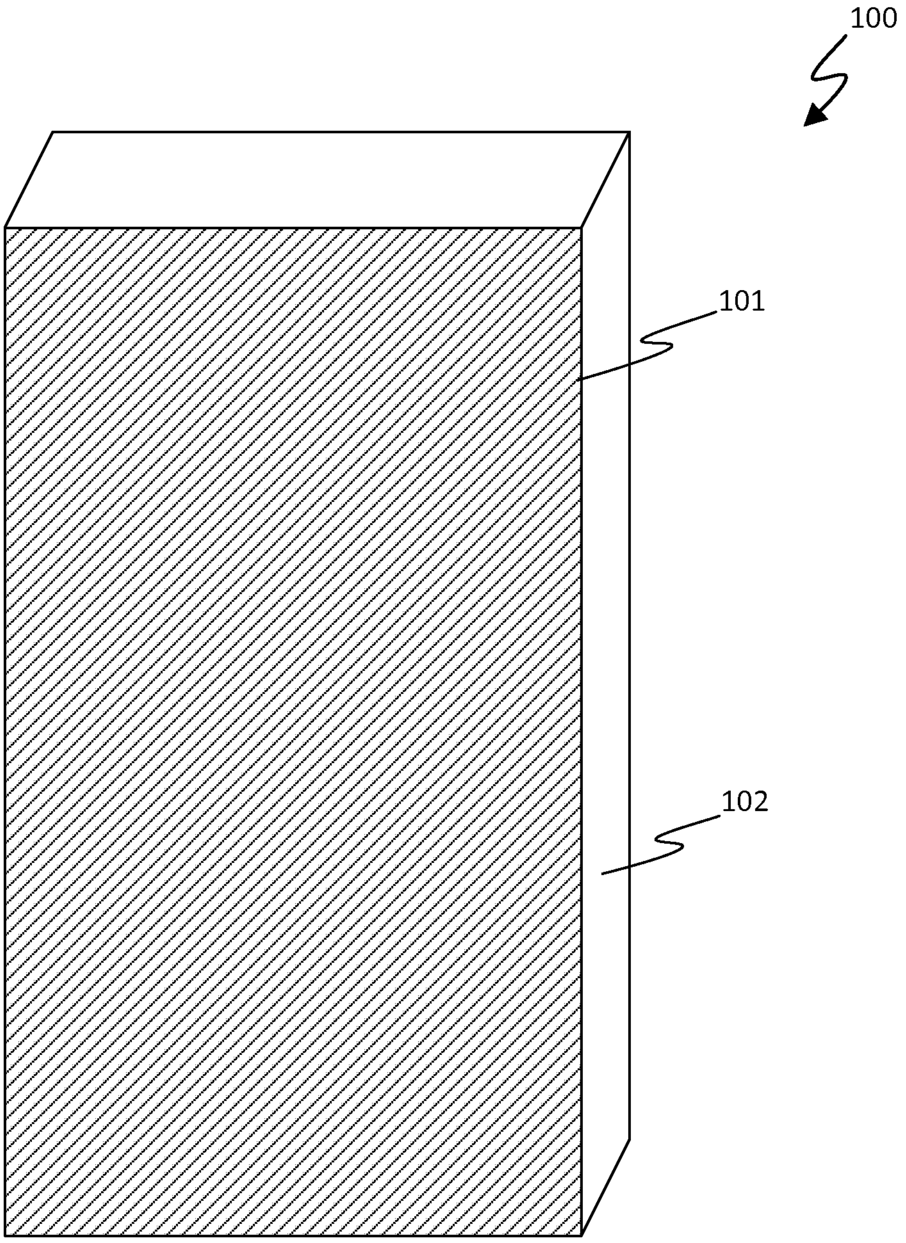
FIG. 1 depicts an example artwork structure in accordance with an embodiment of the present invention.

The following detailed description refers to the accompanying drawings that illustrate example embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the digit(s) in the corresponding reference number.

II. Example Embodiments

The present invention allows visual art, e.g., images, materials, signs, and symbols of art, to be applied to a dispersed solid artwork surface (DSAS) as a core, central material or support base to form artwork structure(s). The dispersed solid artwork surface core material possesses many advantages over traditional solid artwork surface including minimal preparations, minimal finishing work, low cost, light weightedness, recycling of materials, functionality, ease of display, ease of storage, movability, and unique textural surface allowing for unique art form not found in canvases or other traditional materials. For example, the unique shape, design, surface texture and material also allows for the both sides of the DSAS to be utilized and thus an appreciative art owner can have the option of displaying the side of the artwork structure that best suit his mood, surroundings, style, season, etc. In another example, the unique surface texture and material of the DSAS allows for conventional mounting tape to be placed anywhere on the artwork to be used, for example, for displaying of the artwork structure and then such mounting tape can be removed or move to another area or even to the other side or a different side of the artwork structure in case the appreciative art owner would like to display/view the artwork structure at a different angle/side. Such repeated removal or moving of the mounting tape does not damage to the artwork structure or DSAS surface.

According to an embodiment, an artwork structure may include a dispersed solid artwork surface (DSAS), an element, and a medium. The term "medium" is used to refer generally to a tool used to create an artistic expression such as painting, drawing, sculpting, molding, fabricating, or the like. The medium may include, but not limited to, acrylic, metallic, pastel, watercolor, ink, hot wax, fresco, gesso, glaze, gouache, enamel, spray, tempera, latex, magna, oil, water miscible oil, blacklight, primer, stencil, encaustic, chalk, charcoal, conte stick, sumi-e, vinyl, vitreous enamel, crayon, graphite, marker, pencil. In accordance to an embodiment of the present invention, an artwork structure may include, one, two or multiple media, which may be of the same material or mixed and may include a digital construct such as a clock kit, photos, computerized screen, masterpieces and the like. An element may be included optionally and may be superimposed, overlaid, glued, affixed, embedded, or otherwise attached to the DSAS and may serve as a decorative element (wherein the decorative element may be functional), complementary, contrasting material, or the like, to the artwork structure. The included element may be virtually unlimited material sources including decorations, jewels, ribbons, embellishments, glitter, paper, fabric, metal, wood, glass, functional construct shelves, etc., digital construct such as photos, videos, photos of masterpieces and the like. Additionally, the element may also include one or more DSAS surface(s) and may be in combination of the element(s) described above and including a closed-cell foam, a rigid closed-cell lightweight foam (RCL), an open cell-foam, a closed-cell extruded polystyrene foam, an expanded polystyrene foam, a polyurethane foam, a polystyrene, a polystyrene closed-cell foam, a cork, a compact multiply paperboard, a phenolic, a high-impact polystyrene, a fused cell expanded polystyrene foam, a cork, an atactic polystyrene, a syndiotactic polystyrene, other manufactured or naturally-occurring foams, or the like.

The dispersed solid artwork surface comprises preferably of approximately 90% or greater of air, to allow for the weight of the surface to be especially lightweight ("ultra light weight"=ULW) and, optionally, buoyant. Additionally, the dispersed solid surface provides a material including preferably high strength-to-weight ratio (>1 kNm/kg), high specific stiffness (>0.05 MNn/kg), optionally, a relative high out-of-plane compression properties and/or out-of-phase shear properties. The DSAS preferably has a medium density of approximately between 1.3-lb to 3.0-lb, or a high density of approximately 3-lb or greater to provide greater structural integrity, rigidity, and compactness. The DSAS may include, but not limited to, a closed-cell foam, a rigid closed-cell lightweight foam (RCL), an open cell-foam, a closed-cell extruded polystyrene foam, an expanded polystyrene foam, a polyurethane foam, a polystyrene, a polystyrene closed-cell foam, a cork, a compact multiply paperboard, a phenolic, a high-impact polystyrene, a fused cell expanded polystyrene foam, a cork, an atactic polystyrene, a syndiotactic polystyrene, other manufactured or naturally-occurring foams, or the like. No matter which core materials are used, the primary factor is the ultra light weightness of the material, and preferably compactness and structural integrity. The above listing represent no particular order and are only presented because they provide a specific categories and composition the ability to form a final product of a desired functional consistency. The innovative artwork structure may product may then be used in a variety of ways depending on the desired functional and aesthetic goal of the artwork structure and the desired placement within an environment, be it in a home, office, commercial, museum, or industrial setting. Such properties may allow for the paint, film, textile, laminate or the like medium to react and provide one or greater than one dimensional property. Such structure may also allow for expansion, corrugation, fabrication and/or molding.

An example embodiment described an artwork surface of, or similarly to, a DSAS. DSAS is known to be biodegradable and recyclable foam board. Such surface generally comprises a polystyrene foam center, faced with waterproof biodegradable polystyrene liners. DSAS processes great versatility, durability and can be used for limitless applications. For instance, the combination of high density, lightweight foam centers and double thick surface liners produce durable yet economical foam boards with exceptional compressive strength and superior dimensional stability, for example, double-thick bright white surface liners contribute to the overall strength and durability of such high density foam board. The pH neutral surface liners resist moisture absorption, which enhances overall warp resistance. The pH neutral surface contains UV inhibitors to reduce yellowing. The DSAS is known to resist dents and retain its original dimension. The DSAS closed-cell structure offers excellent resistance against moisture, water vapor, rot, mold, or mildew and is chemically inert, not biodegradable and not subject to photolysis therefore resulting in a high quality artwork that can last upwards of hundreds of years requiring little restoration. The DSAS provides a flat surface for a medium and/or element to be applied, adhere, affixed, laminated, or the like.

Furthermore, an embodiment may include an ultra lightweight polystyrene foam-centered RCL board with clay coated paper liners that can be used for a number of different applications. For example, these foam boards may be bonded, for example, between two layers of wood-fiber veneer to provide durability, rigidity, as well as moisture resistance. In another embodiment, closed-cell extruded polystyrene foam board may be naturally acid-free foam board to deliver protection from damaging pollutants and harmful gases and acids. The foam board consists of chemically inert core face with pH neutral paper liners. The foam center is warp-resistant and engineered to retain its thickness during mounting. The extruded polystyrene foam board bonded between, for example, two layers of wood-fiber veneer provides durability and rigidity as well as moisture resistance. The embodiment is preferably to be acid-free and to have a chemically inert center, which delivers two-sided protection from damaging pollutants and harmful gases. Additionally, the embodiment is highly warp-resistant and engineered to retain its thickness during mounting. Consequently, the use of a foam board as a medium for application of art advantageously allows the artist to present a light weighted art work structure. The light weighted art work structure may be articulatable, wherein the ultra light weight and articulability of the artwork allows for potential incorporation of the artwork within a multi-dimensional, interior or architectural environment, such as forming a unique type of jointed functional and/or aesthetic architectural structure such as, but not limited to, panels, separators, screens, cabinet covers, pedestal, mirrors, clocks, vases, display stands, artworks, or the like.

FIG. 1 illustrates an example embodiment of the present invention. Accordingly, the artwork structure 100 illustrates a painting in which paint, including acrylic paint 101, is applied to an ultra lightweight DSAS, including a polystyrene closed-cell foam (PCCF) 102. In further accordance with this example, the acrylic paint is applied directly to the PCCF with little initial preparation to achieve a unique texture, look and feel of the artwork. The example art surface provides greater flexibility and/or control with respect to material cost, preparation, time consumption, and freedom of artistic expression. One of the advantages of using ULW DSAS is the thermophilic property and/or reactive property of the DSAS to a medium such as an acrylic paint wherein the ULW DSAS reacts to the paint by remolding or collapsing or melting of the surface. The ULW DSAS, in combination of its ability to be reactive to a medium presents a new art form, thereby increasing the repertoire of the artist's creativity in the visual arts. For example, a single paint sprayed directly to the PCCF may take on many appearances and textures, depending on the distance or the way at which paint is applied to the DSAS, whether it melts the PCCF for a deeper penetration and more textural look, remold the micro-surface, or merely glaze the surface for a smoother finish. Also, the use of DSAS is so effortless that the finishing work may solely consist of applying the mounting tape, as in the case of FIG. 1. In other examples, the finishing work may include adding element(s), overlaying with another medium/media or DSA surface(s), or the like.

In another embodiment, an artwork structure may be created by preparing a solid artwork surface (DSAS) to enhance acceptance and/or effects of a medium, applying said medium to said dispersed solid artwork surface, optionally superimposing an element to said medium to said dispersed solid artwork surface, finishing said dispersed artwork surface to create an artwork structure, and displaying said artwork structure. FIG. 1 shows the artwork structure whereby the preparation step of the DSAS and the superimposition of an element step are optional steps and may be omitted. According, the artwork structure may include painting, drawing, sculpting, molding, fabricating, or the like. The medium of the artwork may include, but not limited to, acrylic, metallic, charcoal, tempera, chalk, pastel, watercolor, ink, hot wax, fresco, gesso, glaze, gouache, enamel, spray, tempera, latex, magna, oil, water miscible oil, blacklight, primer, stencil, encaustic, chalk, charcoal, conte stick, sumi-e, vinyl, vitreous enamel, crayon, graphite, marker, pen, pencil, letterpress, quill, digital construct, architectural medium/media, and carpentry medium/media.

Figure 2:
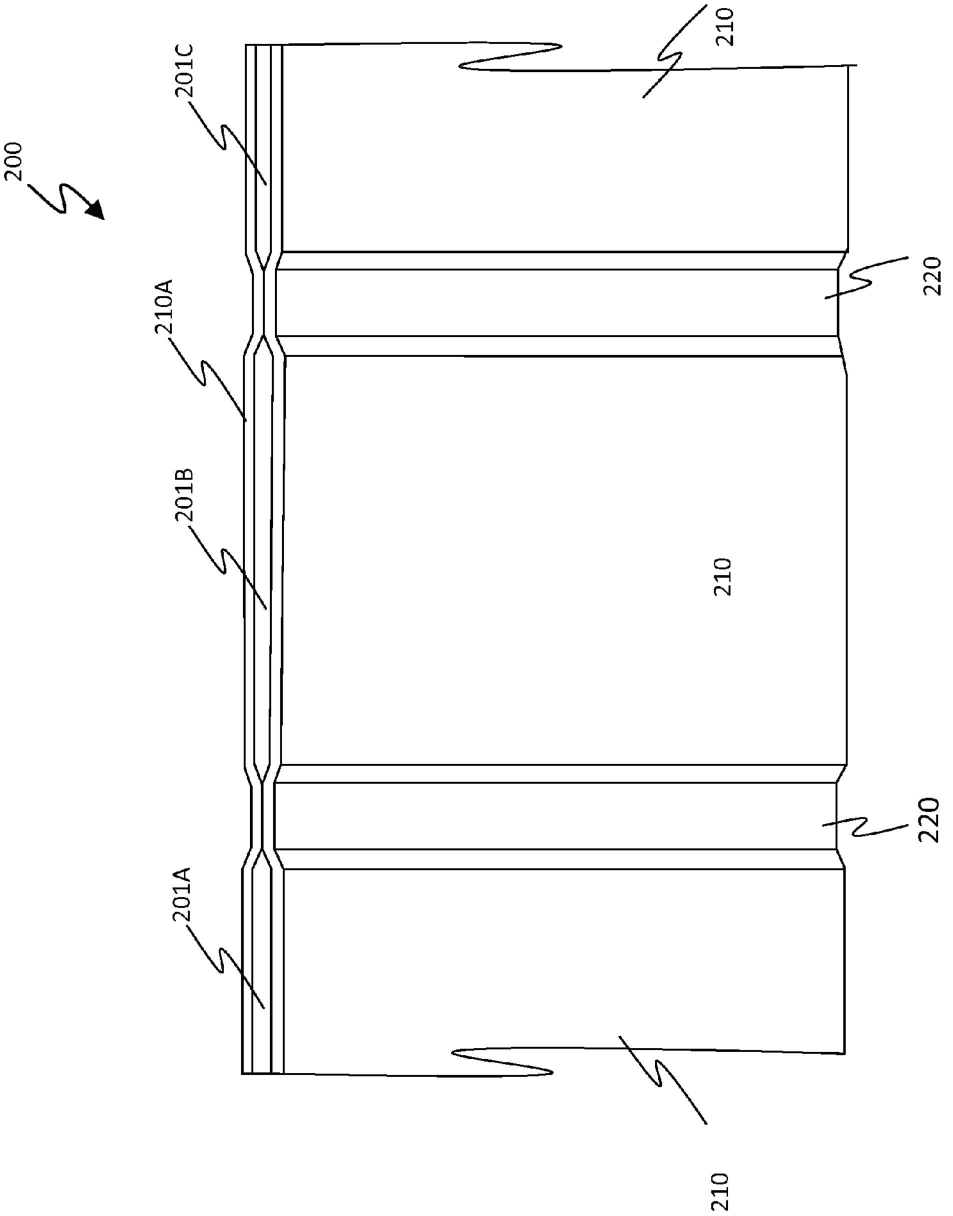
FIG. 2 depicts an example artwork structure joined and articulatable in accordance with an embodiment of the present invention.

In one embodiment, the artwork structure comprises at least two discrete and adjacent rigid light weight core or central materials on which are superimposed thin flexible contiguous sheets in an opposing relationship, with the flexible contiguous sheets adhering to the discrete and adjacent rigid light weight core materials thus allowing for the provision of an articulatable art work structure that is able to provide a continuation and/or varied and/or oppositional perspective of the artwork. FIG. 2 illustrates an example artwork structure 200 according to one embodiment of the present invention. Accordingly, example embodiment may include a plurality of DSAS panels to be joinable and articulatable. As shown in the figure, artwork structure 200 shows a joined and articulative nature of the artwork providing for use in varying geometric forms and environments including interior or architecture structure such as wall panels, screens, display boards, etc. Accordingly, artwork structure 200 may include discrete and adjacent rigid light weight core materials 201A-C on which are superposed thin flexible contiguous sheets 210/210A in an opposing relationship, with flexible contiguous sheets 210/210A adhering to discrete and adjacent rigid light weight core materials 201A-C and to each other at articulatable joints or flex sections 220, allowing for visual art structure to be made, expressed on the surfaces of opposing contiguous sheets 210/210A and viewed from multiple perspectives by providing the artist the ability to present contiguous art work that can be articulated to provide a continuation and/or varied perspective of said visual artwork. In another embodiment, the plurality of DSAS panels may be joined for an articulated contiguous structure composition by adhering superimposed element(s) in opposing relationship over another DSAS panel(s) to form an articulative joint providing gap(s) between the DSAS panel(s) allowing for the provision of articulatable artwork structure providing one or more perspective(s) such as continuation, varied, oppositional, or multi-dimensional perspective(s). Additionally, the joined and articulated continuous artwork structure may be reinforced with element(s), film and/or polymer laminate and may be transparent or translucent.

Illustrative artwork structure 200 shows the articulative nature of the present invention, effectuated as a result of incorporating articulatable joints or flex sections 220 vertiginously connecting discrete and adjacent rigid light weight core materials 201A-C. The surface of the superposed thin contiguous sheets allows for an artist to apply a medium including acrylic paint, metallic paint, silk-screen, oil, brushes, trowels or other tools, printed on, graphics, graffiti, or the like. Thus, the present invention allows for a double faced articulative artwork structure wherein an artist uses media, materials, images, symbols, or the like, to communicate about the self as expression, or the world as a narrative or imagination or prediction or teaching. Further structural and operational embodiments will be apparent to persons skilled in the relevant art(s) based on the foregoing discussion. Although panels are depicted as wall panels, persons skilled in the relevant art(s) will appreciate that panels may be structured or molded to include any configuration suitable for aesthetic or functional value, including ceilings, interior spaces, screens, partitions, window screens, floorings, doors, display boards, pedestals, etc.

In another embodiment, the superimposed then flexible contiguous sheets in opposing relationship, and which also forms the articulating joint sections of the innovative artwork structure, may be provided with an overlay of transparent or translucent flexible polymer laminate, e.g., Mylar® or Kevlar® reinforced nylon sheets or film which have better slide wear resistance than general purpose nylon films, and thus allowing for the structuralization of at least two double faced articulatable generally contiguous artwork. Still in another embodiment, the novel artwork structure may be provided with superimposed thin flexible contiguous sheets in an opposing relationship that are made from ballistic nylon fabrics, e.g., Cordura® and Kevlar® ballistic fabrics. The incorporation on ballistic fabrics as the contiguous and articulating "skin" of the present invention would allow the artwork structure to provide durable performance, including enhanced tear, abrasion and puncture resistance, and long lasting durability. The superposed thin flexible contiguous sheets in an opposing relationship of the novel artwork structure can be worked on, for example, with any artist paint brushes, oil paint trowel or other tools, printed on, hand-finished graphics including graffiti, etc. Alternatively, the superimposed thin flexible contiguous sheets imprinted on or vat dyed with patterns or designs may be produced on a commercial/industrial scale, to achieve efficient customization and economy of scale for mass production. A thin cross-section or profile of the discrete and adjacent rigid light weight core materials is essential to the ultra lightweight and efficacy of the novel artwork structure.

Figure 3:
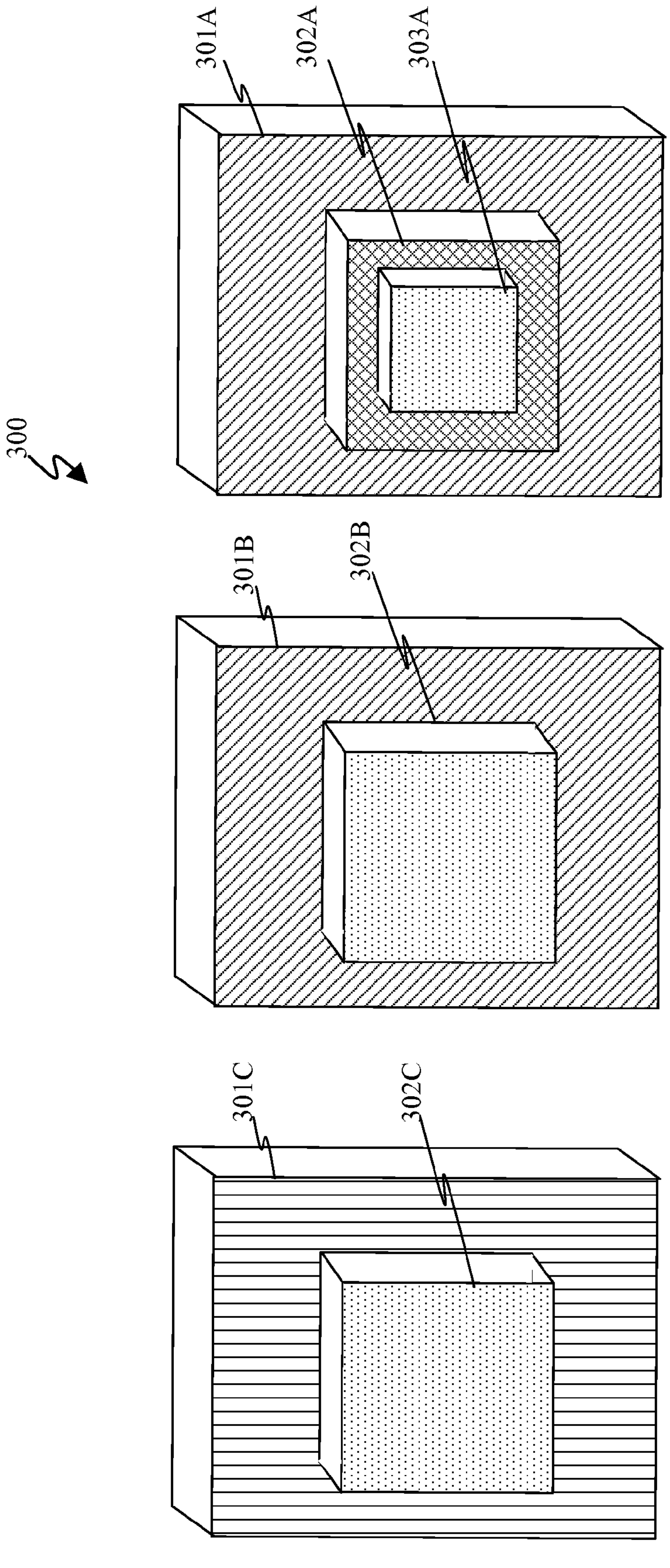
FIG. 3 depicts an example artwork structure superimposed with one or more elements in accordance with an embodiment of the present invention.

One of the advantages of using an ULW artwork surface is the ease of superimposing DSAS(s), medium/media, element(s), mixed media, mixed elements, multiple DSASs to form multi-layers and/or multi-dimensional artwork structures. Such technique offers a distinct advantage over the traditional art technique and posses little compromise to the ultra lightweightness of the artwork structure. In another embodiment, an artwork structure may be optionally superimposed with an element wherein said element may be the same of a different materials/sources. FIG. 3 illustrates an example embodiment of the present invention in which the artwork structure 300 comprising DSAS is overlaid with layers of DSAS panels to produce a unique three-dimensional artwork structure. According to the example shown, the polystyrene closed-cell foam (PCCF) panels 301A, 301B and 301C are superimposed by the PCCF panels 302A, 302B, and 302C, respectively. Additionally, the PCCF panels 301A/302A are superimposed by PCCF panel 303A and altogether to create, among other techniques, shadows, reflections and depth at the same time barely adding additional weight to the artwork structure.

Figure 4:
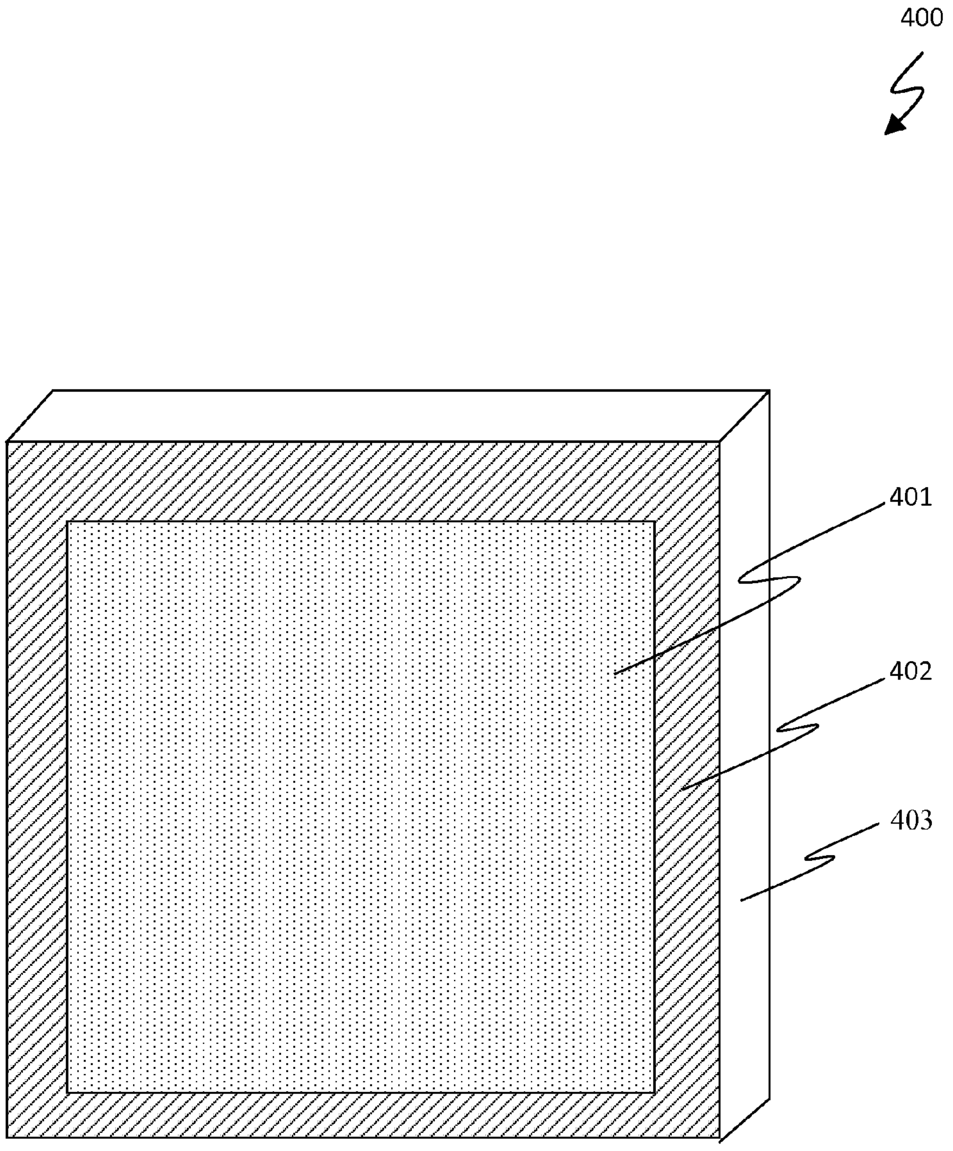
FIG. 4 depicts an example interior structure in accordance with an embodiment of the present invention.

In another embodiment, the superimposed element may be temporary element that supplement the creative process enabling the creative process or the element may be a permanent feature of the artwork structure. The superimposed or overlay element is limitless, including, a permanent or temporary element, an ornamental veneer, a decorative, contrasting or complementing element(s), transparent, translucent, or opaque, contain graphic matter, cover the complete surface or part of the surface. For example, as further discussed below and as illustrated in FIG. 4, a mirror surface can be superimposed to the PCCF to create a home interior furnishing. The superimposable ultra lightweight surface foam board may include a peel and stick surface liner(s). Such liners may be made from 12-pt clay-coated paper liner(s). These ULW surface may be made of high quality extruded polystyrene foam between two layers of 1 mm expanded PVC liner. They are extremely dent-resistant, warp-resistant, weatherproof and rigid. The surfaces are pH neutral and compatible with cold laminating films and liquid laminating formulas, making the RCL foam board ideally suited to form an ULW DSAS artwork surface of the present invention. In another example, a polyurethane or other polymer laminate or layer may be applied to the artwork structure to add protective and insulation value to the panels. The example embodiment needs not necessarily require mounting, backing, framing, or producing holes in the wall to securely display the art structure. In accordance with this example, use of mounting tape is sufficient to support the lightweight art structure.

FIG. 4 depicts an sample embodiment of the present invention whereby a mirror surface 401 overlays a paint medium which is applied onto a honeycomb structural element 402, such as a honeycomb structure foam drawer liner, which is superimposed onto a ULW DSAS foam 403. Accordingly, the ULW DSAS may include rigid light weight foam, honeycomb structural material, cork, lightweight fibers, post-consumer content material, including a man-made or naturally occurring honeycomb structure that have the geometry of a honeycomb. The superimposition of the honeycomb structure element allows for the additional texture and stability of the mirror structure without added weight. The geometry of a honeycomb structure can vary but the common feature of all such structure is an array of hollow cells formed between thin vertical walls. The cells are typically columnar and hexagonal in shape. A honeycomb shaped structure provides a material with low density, light-weightedness and relative high our-of-plane compression properties and out-of-plane shear properties. Man-made honeycomb structure materials are commonly made by layering a honeycomb material between two thin layers that provide strength in tension and forming a plate-like assembly. Honeycomb materials are widely used where flat or slightly curved surfaces are needed along with their high strength-to-weight ratio. They are widely used in structural mounting applications where lightweightness, high compression, flexibility, and structural integrity are demanded. Thus, they can be found in many fields, especially packaging materials such as paper based honeycomb cardboard sheets, honeycomb paper cardboards, etc. The corrugated sheet may be structured as a single-facer or double-backer or facer. In another embodiment, corrugated honeycomb paper cardboard sheets may be specified by the construction (single or double face, single wall, double wall, etc., (honeycomb size, edge crush strength, flat crush, basis weights of components (pounds per thousand square feet, grams per square meter, etc.,) surface treatments and coatings, etc. The choice of corrugated medium, honeycomb size, combining adhesive and linerboards can be varied to engineer to corrugated board with specific properties, such as the articulatable artwork structure of the present invention. Consequently, the use of man-made honeycomb core material, i.e., paper based honeycomb cardboard sheet(s) advantageously allows the artist to present an articulatable light weighted art work structure, wherein the ultra light weightedness and articulatability of the novel artwork structure within an interior or architectural environment, such as forming a unique type of pointed functional/aesthetic architectural panels. e.g., wall panels, separators, screens, flooring, display boards, cabinet covers, etc., and may be fabricated using the foregoing compositions. Furthermore, and as an example, polyurethane or other polymer laminate or layer may be applied to the innovative artwork structure to add protective and insulation value to the panels.

In another embodiment, the ULW artwork surface is corrugated fiberboard or corrugated paper. The key raw material in corrugating is paper, with different grades or each layer making up the corrugated box. Based on supply chain and manufacturing scale considerations, paper is produced in separate plants called paper mills. The corrugated honeycomb cardboard sheet is often 0.026 pounds per square foot (0.13 kg/m2) basis weight in the honeycomb pattern on geared wheels. This is joined to a flat linerboard with adhesive to form single face board. At the double-backer, a second flat linerboard is adhered to the other side of the honeycomb medium to form single wall corrugated board. Corrugated honeycomb paper cardboard sheets can be specified by the construction (single or double face, single wall, double wall, etc.), honeycomb size, edge crush strength, flat crush, basis weights of components (pounds per thousand square feet, grams per square meter. etc.), surface treatment and coatings, etc. The choice of corrugated medium, honeycomb size, combing adhesive, and linerboards can be varied to engineer a corrugated board with specific properties, such as the herein art structure. The example embodiment describe herein advantageously allows the artist to present a light weighted art structure with minimal processing and preparation. The light weighted art work structure may be articulatable, wherein the light weightedness and articulability of the artwork allows for potential incorporation of the artwork within a multi-dimensional, interior or architectural environment, such as forming a unique type of jointed functional and/or aesthetic architectural structure such as, but not limited to, panels, separators, screens, cabinet covers, pedestal, mirrors, clocks, vases, display stands, artworks, or the like.

Figure 5:
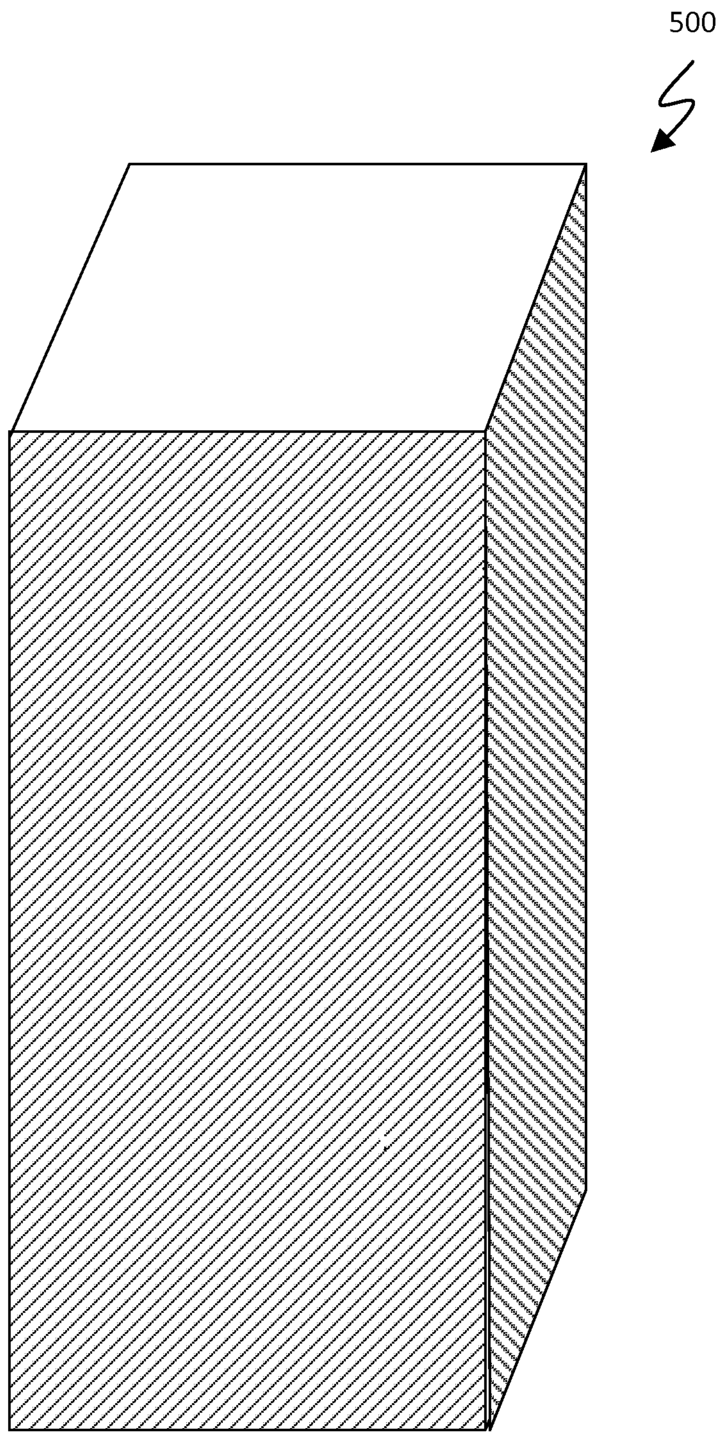
FIG. 5 depicts an example architectural structure in accordance with an embodiment of the present invention.

FIG. 5 illustrates an example architectural structure that may be fabricated according to an embodiment of the present invention. Accordingly, the ULW core material may be overlaid, stacked, superimposed or arranged to create an interior or architectural structure. As shown in the figure, structure 500 comprises a plurality of ULW polystyrene surfaces stacked and adhered to create a functional pedestal. Additionally, the ULW structure may be overlaid with a medium/media and/or element(s) for enhanced aesthetic values. The ULW structure may be joined and articulated for a contiguous structure. Such structure may be joined and articulated by adhering superimposed element(s) allowing for the provision of articulatable artworks structure providing one or more perspective(s) such as continuation, varied, oppositional, multi-dimensional perspective(s). In another embodiment the described art may be applied to a medium of, or similarly to, a cork medium. Composition corks are manufactured from natural cork grains and therefore maintain most of the same characteristics attributed to cork in its natural state. Different cork grain sizes create composition cork sheet in grades and appearances to satisfy specific purposes and uses. Cork sheets are used for many products, including bulletin boards, tack boards, gaskets, model, crafts, etc., and especially as compact and rigid cork sheets that offer light weightedness and high performance structural integrity, qualities which are integral to the execution of the present invention.

The example embodiments describe herein advantageously allows the artist to present a light weighted art structure with minimal processing and preparation. The ULW DSAS artwork surface advantageously allows the artist to present an articulatable light weighted artwork structure, wherein the ultra light weightedness and articulability of the novel artwork structure allows for the potential incorporation of the artwork structure within as interior or architectural environment, such as forming a unique type of jointed functional and/or aesthetic architectural panel(s), including wall panels, separators, screens, display boards, cabinet covers, etc., and may be fabricated using the foregoing compositions. Furthermore, and as an example, polyurethane or other polymer laminate or lay may be applied to the innovative artwork structure panels to add protective and insulation value to the panels. The innovative artwork structure allows the artist to incorporate modern light weight core material technology in the presentation of articulatable artwork structure that heretofore has been presented in a generally linear, heavy and unidirectional format.

III. Conclusion

The innovative concept achieves exposition of its specification goals. The words used in this specification to describe the invention and its various embodiments are to be understood not only in the sense of their commonly defined meanings, but to include and special definition in this specification including structure, material or acts beyond this scope of the commonly defined meanings. Thus, if an element can be understood in the context of this specification as including more than one meaning, then it must be understood as being generic to all possible meanings supported by this specification and by the word or words describing the element.

The definitions of the words or elements of this present invention and its various embodiments are, therefore, defined in this specification to include not only the combination of elements which are literally set forth, but all equivalent structure, materials or acts for performing substantially the same function in substantially the same way to obtain the same result. In this sense, it is therefore contemplated that an equivalent substitution of two or more elements may be made for any one of the elements of the invention and its various embodiments or that a single element may be substituted for two or more elements in a claim.

Changes from the claimed subject matter as viewed by a person skilled in the art, now known or later devised, are expressly contemplated as being equivalents within the spirit and scope of the invention and its various embodiments. Therefore, obvious substitutions now or later known to one skilled in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While composition and applications of the innovative artwork structure according and its various embodiments have been described above, it should be understood that they have been presented by way of example and for illustration purposes only, and not as limitations of the invention in any way. It will be apparent to persons skilled in the relevant art the present invention embraces alternative, modifications, and variations without departing from the spirit and scope of the invention. Thus, the breadth and scope of the present invention should not be limited by any of the above-described example embodiments, but should be defined only in accordance with the following claims and their equivalents.

What is claimed is:

1. A method of creating an artwork structure, comprising:

applying a medium to a dispersed solid artwork surface (DSAS), wherein said DSAS is an ultra lightweight (ULW) surface (ULWDSAS) comprising at least 90% air, finishing said ULWDSAS to create an artwork structure, and displaying said artwork structure.

2. The method of claim 1, wherein said ULWDSAS is selected from the group consisting of a rigid closed-cell lightweight foam (RCL), a closed-cell extruded polystyrene foam, an expanded polystyrene foam, a polyurethane foam, a polystyrene, a polystyrene closed-cell foam (PCCF), a cork, a compact multiply paperboard, a high-impact polystyrene, a fused cell expanded polystyrene foam, an atactic polystyrene, a syndiotactic polystyrene, a honeycomb structural material, a corrugated fiberboard; and a post-consumer content material.

3. The method of claim 1, wherein said medium is one or a combination of media selected from the group consisting of an acrylic, metallic, pastel, watercolor, ink, hot wax, fresco, gesso, glaze, gouache, enamel, spray, tempera, latex, magna, oil, water miscible oil, blacklight, primer, stencil, encaustic, chalk, charcoal, conte stick, sumi-e, vinyl, vitreous enamel, crayon, graphite, marker, and pencil.

4. The method of claim 1, wherein said artwork surface comprises a plurality of ULWDSAS joinable and articulatable.

5. The method of claim 1, wherein said ULWDSAS comprises a plurality of ULWDSAS joining for an articulated contiguous artwork structure composition by adhering superimposed said element in opposing relationship over a first and a second ULWDSAS providing a gap between said first and second ULWDSAS allowing for the provision of articulatable artwork structure providing one or more perspectives.

6. The method of claim 1, further comprising a plurality of ULWDSAS including at least a first ULWDSAS and a second ULWDSAS that are joined to provide an articulated contiguous artwork structure composition by:

adhering superimposed said element in opposing relationship over a first and a second ULWDSAS to form an articulative joint providing a gap between said first and said second ULWDSAS, configuring said first ULWDSAS and said second ULWDSAS to enable viewing one or more perspectives, and reinforcing said articulative joint with a polymer laminate.

7. A method of creating an artwork structure comprising:

preparing a dispersed solid artwork surface (DSAS), wherein said DSAS is an ultra lightweight (ULW) surface (ULWDSAS) comprising at least 90% air, applying a medium to said ULWDSAS, superimposing an element to said medium to said ULWDSAS, finishing said ULWDSAS to create an artwork structure.

8. The method of claim 7, wherein said DSAS is an ultra lightweight (ULW) surface selected from the group consisting of a rigid closed-cell lightweight foam (RCL), a closed-cell extruded polystyrene foam, an expanded polystyrene foam, a polyurethane foam, a polystyrene, a polystyrene closed-cell foam (PCCF), a cork, a compact multiply paperboard, a high-impact polystyrene, a fused cell expanded polystyrene foam, an atactic polystyrene, a syndiotactic polystyrene, a honeycomb structural material, a corrugated fiberboard, and a post-consumer content material.

9. The method of claim 7, wherein said medium is one or a combination of media selected from the group consisting of an acrylic, metallic, pastel, watercolor, ink, hot wax, fresco, gesso, glaze, gouache, enamel, spray, tempera, latex, magna, oil, water miscible oil, blacklight, primer, stencil, encaustic, chalk, charcoal, conte stick, sumi-e, vinyl, vitreous enamel, crayon, graphite, marker, and pencil.

10. The method of claim 7, wherein said element is an ultra lightweight solid dispersed artwork surface selected from the group consisting of rigid closed-cell lightweight foam (RCL), a closed-cell extruded polystyrene foam, an expanded polystyrene foam, a polyurethane foam, a polystyrene, a polystyrene closed-cell foam (PCCF), a cork, a compact multiply paperboard, a high-impact polystyrene, a fused cell expanded polystyrene foam, an atactic polystyrene, a syndiotactic polystyrene, a honeycomb structural material, a corrugated fiberboard, and a post consumer content material.

11. The method of claim 7, wherein said element is a decorative or a combination of decorative elements selected from the group consisting of jewels, ribbons, embellishments, glitters, papers, fabrics, metals, woods, glass, functional constructs, shelves, digital constructs, photos, videos, photos of masterpieces, a rigid lightweight closed-cell foam (RCL), a closed-cell extruded polystyrene foam, an expanded polystyrene foam, a polyurethane foam, a polystyrene, a polystyrene closed-cell foam (PCCF), a cork, a compact multiply paperboard, a high-impact polystyrene, a fused cell expanded polystyrene foam, an atactic polystyrene, a syndiotactic polystyrene, a honeycomb structural material, a corrugated fiberboard, and a post-consumer content material.

12. The method of claim 7, wherein said dispersed artwork surface comprises a plurality of ULWDSAS joinable and articulatable.

13. The method of claim 7, wherein said dispersed solid artwork surface (DSAS) comprises a plurality of DSAS joining for an articulated contiguous artwork structure composition by adhering superimposed said element in opposing relationship over a first and second DSAS providing a gap between said first and second DSAS allowing for the provision of articulatable artwork structure providing one or more perspectives.

14. The method of claim 7, further comprising a plurality of ULWDSAS joining for an articulated contiguous artwork structure composition by:

adhering superimposed said element in opposing relationship over a first and second ULWDSAS to form an articulative joint providing a gap between said first and second ULWDSAS, configuring said first DSAS and said second DSAS to enable viewing one or more perspective, reinforcing said articulative joint with a polymer laminate.

15. An artwork structure comprising:

an ultra lightweight dispersed solid artwork surface (ULWDSAS), an element, and a medium, wherein said ULWDSAS comprises rises a plurality of ULWDSAS joinable and articulatable by:

adhering superimposed said element in opposing relationship over a first and second ULWDSAS to form an articulative joint providing a gap between said first and second ULWDSAS, configuring said first ULWDSAS and said second ULWDSAS to enable viewing of one or more perspectives, and reinforcing said articulative joint with a polymer laminate.

16. The artwork structure of claim 15, wherein said ULWDSAS is is selected from the group consisting of a rigid closed-cell lightweight foam (RCL), a closed-cell extruded polystyrene foam, an expanded polystyrene foam, a, a polyurethane foam, a polystyrene, a polystyrene closed-cell foam (PCCF), a cork, a compact multiply paperboard, a high-impact polystyrene, a fused cell expanded polystyrene foam, an atactic polystyrene, a syndiotactic polystyrene, a honeycomb structural material, a corrugated fiberboard, and a post-consumer content material.

17. The artwork structure of claim 15, wherein said medium is one selected from the group consisting of an acrylic, metallic, pastel, watercolor, ink, hot wax, fresco, gesso, glaze, gouache, enamel, spray, tempera, latex, magna, oil, water miscible oil, blacklight, primer, stencil, encaustic, chalk, charcoal, conte stick, sumi-e, vinyl, vitreous enamel, crayon, graphite, marker, and pencil.

18. The artwork structure of claim 15, wherein said element is a decorative or a combination of decorative elements selected from the group consisting of jewels, ribbons, embellishments, glitter, paper, fabric, metal, wood, glass, functional construct, shelves, digital construct, photos, videos, photos of masterpieces, a closed-cell foam, rigid lightweight closed-cell foam (RCL), a closed-cell extruded polystyrene foam, an expanded polystyrene foam, a polyurethane foam; a polystyrene, a polystyrene closed-cell foam (PCCF), a cork, a compact multiply paperboard, a high-impact polystyrene, a fused cell expanded polystyrene foam, an atactic polystyrene, a syndiotactic polystyrene, a honeycomb structural material, a corrugated fiberboard, and a post-consumer content material.

19. The artwork structure of claim 16, wherein said ULWDSAS comprises a thermophilic property.

20. The artwork structure of claim 16, wherein said ULWDSAS is configured to react with said medium.

* * * * *